United States Patent [19]

Nishikawa et al.

[11] 4,354,422
[45] Oct. 19, 1982

[54] LOAD RELIEF DEVICE FOR POWER STEERING SYSTEM

[75] Inventors: Masao Nishikawa, Tokyo; Takashi Aoki, Wako; Yoichi Sato, Fujimi, all of Japan

[73] Assignee: Honda Giken Kogyo Kabushiki Kaisha, Tokyo, Japan

[21] Appl. No.: 141,104

[22] Filed: Apr. 17, 1980

[30] Foreign Application Priority Data

Apr. 19, 1979 [JP] Japan ................................. 54-48163

[51] Int. Cl.³ ........................ F15B 13/16; F15B 15/22
[52] U.S. Cl. ................................... 91/358 R; 92/136; 180/148; 91/382
[58] Field of Search .......................... 180/148; 92/136; 91/358 R, 358 A, 382, 368, 375 R, 375 A, 385, 400

[56] References Cited

U.S. PATENT DOCUMENTS

| | | | |
|---|---|---|---|
| 2,218,272 | 10/1940 | Wabeke | 91/358 R |
| 2,930,359 | 3/1960 | MacDuff | 91/368 |
| 2,964,017 | 12/1960 | Hruska | 91/368 |
| 3,233,408 | 2/1966 | Markert et al. | 91/358 R |
| 3,972,264 | 8/1976 | Field, Jr. et al. | 91/358 A |

FOREIGN PATENT DOCUMENTS

| | | | |
|---|---|---|---|
| 1044005 | 6/1953 | France | 91/358 R |
| 1150452 | 4/1969 | United Kingdom | 91/358 R |

*Primary Examiner*—Paul E. Maslousky
*Attorney, Agent, or Firm*—Irving M. Weiner; Pamela S. Burt; John L. Shortley

[57] ABSTRACT

A load relief device for a power steering system of a vehicle. The load relief device provides release of loads from a hydraulic pressure supply pump of the power steering system when the output member of the system is near the end of its stroke by short-circuiting between a hydraulic pressure source and an oil reservoir of the power steering system. The load relief device includes an assembly for detecting the end of a stroke being executed by the power steering system, and upon detection of the end of the stroke, the assembly operates to bring a four-way valve of an open center type to a neutral position thereof, regardless of the steering torque being applied to the power steering system.

15 Claims, 4 Drawing Figures

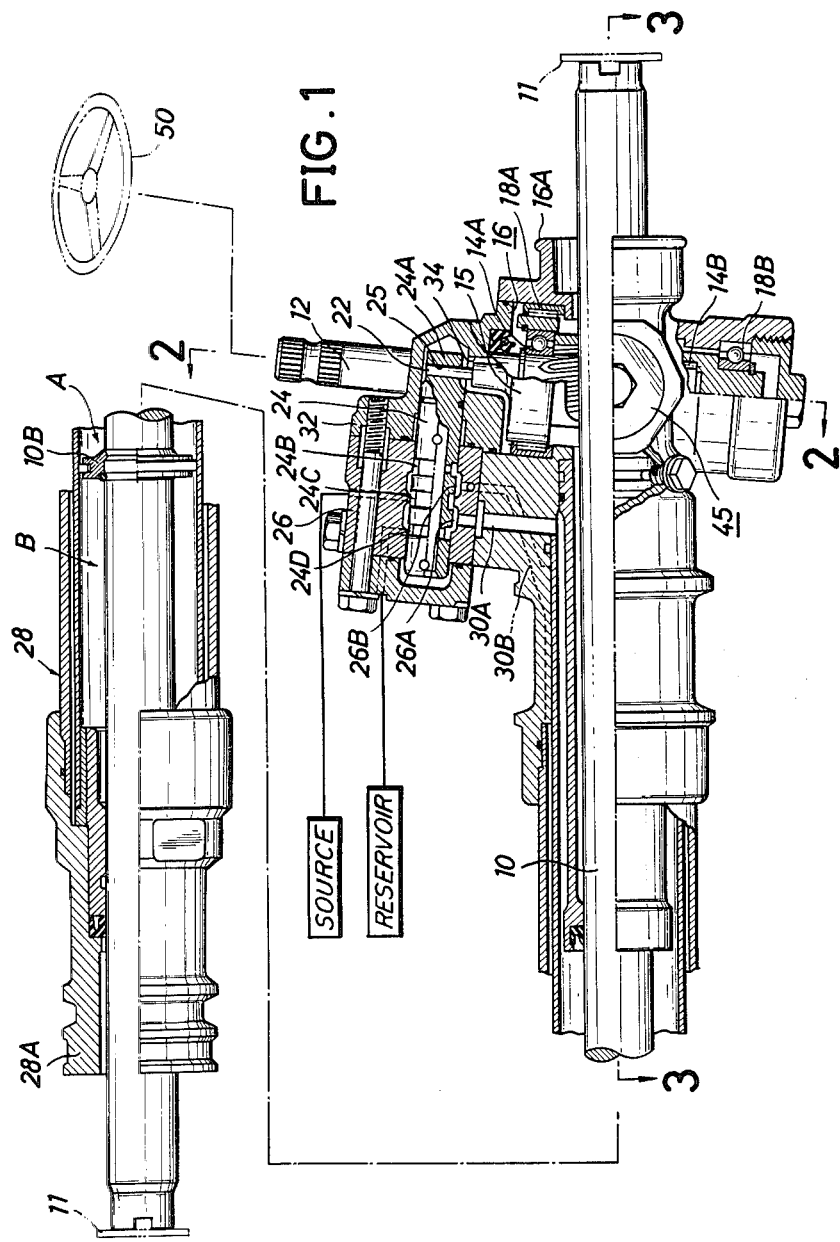

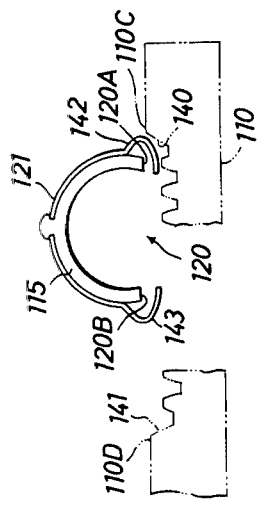
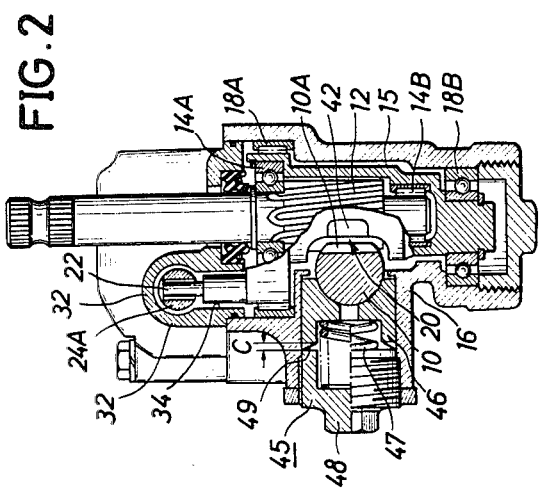
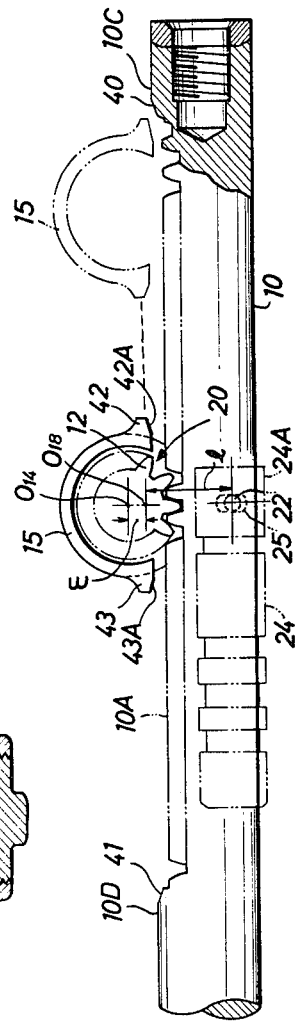

LOAD RELIEF DEVICE FOR POWER STEERING SYSTEM

BACKGROUND OF THE INVENTION

1. Field of the Invention

The present invention relates to a device for releasing loads from a hydraulic pressure supply pump provided in a power steering system for vehicles when the output member of the power steering system is near the end of its stroke. Relief of the loads is effected by short-circuiting between a hydraulic pressure source and an oil reservoir provided in the power steering system.

2. Description of Relevant Art

Commonly-employed types of power steering systems for vehicles are constructed such that a directional control valve is actuated by a steering force applied to the steering wheel of the vehicle to change the connection of hydraulic oil passages leading to a power cylinder to which the steering or front wheels of the vehicle are coupled via link means. In an oil hydraulic circuit including such hydraulic oil passages, hydraulic oil serving as an auxiliary power medium is circulated by means of a pump which is driven, for example, by the engine of the vehicle in which the power steering system is mounted.

The power steering system of the aforesaid type generally employs a known "open center system", in which hydraulic oil is permitted to permanently circulate in the oil hydraulic circuit when the directional control valve is in its neutral position. Therefore, an engine employing such "open center" type of power steering system undergoes minimum horsepower loss during interruption of the supply of auxiliary power to the front wheels when the directional control valve is in its neutral position. In such power steering system using the open center system, when a further steering force is applied to the steering wheel, even after the steering wheel is rotated to its extreme position with a contact portion of the link means urged against its stopper, the directional control valve is brought into a position wherein one of two hydraulic oil passages leading to the power cylinder is blocked, whereas hydraulic oil is fed to the power cylinder only through the other passage. Consequently, the pressure in the hydraulic oil circuit becomes excessively high, such that when a relief valve mounted in the hydraulic pressure supply pump is opened, the increased pressure drops suddenly and directly to the atmospheric pressure which is prevalent downstream of the relief valve, through the latter valve. Due to this sudden large drop in pressure, a large amount of heat is produced and the relief valve is subjected thereto, often causing seizure of the pump.

Further, the relief valve normally has its valve opening pressure set at a valve higher than a maximum pressure required for power steering operation. Therefore, in the known "locked position", in which the contact portion of the link means is in urging contact with the stopper, the pump is subjected to a large load corresponding to the high valve opening pressure. Such condition may result in stopping of the engine when the engine is operating in an idling state with low torque, or slippage of the V-belt for driving the pump.

To overcome the above-described drawbacks, some conventional load relief devices, or unloaders, have heretofore been employed which are designed to permit hydraulic oil as an auxiliary power medium to by-pass the hydraulic pressure supply pump for relief of loads applied thereto when the steering wheel is rotated to its extreme position. However, in such conventional unloading devices the power cylinder for providing auxiliary power is provided with by-pass valves at opposite ends thereof which are adapted to open upon sensing the contact of the contact portion of the link means with the stopper, which inevitably results in a power steering system which is large in size. Further, it is necessary to adjust the timing of opening of the by-pass valves with respect to the striking of the link means against the stoppers. Still further, during machining of the by-pass valve portions, very close tolerances must be met for prevention of oil leakage through the valve portions. Particularly, if the steering force transmission mechanism of the power steering system is a rack-and-pinion type, the power cylinder must be designed so as to be longer in stroke than a worm-and-sector type, and correspondingly smaller in piston area. The shape of the power cylinder is therefore unsuitable for mounting of by-pass valves thereon.

Known load relief devices include a type in which a four-port connection valve (four-way valve) is used as the directional control valve of the power steering system, and by-pass valves are arranged so as to be maintained in an inoperative condition within the normal changeover action stroke of the four-port connection valve. In this type of unloader device, if a further steering force is applied when the unloader is in a locked state, the valve body of the four-port connection valve is displaced over its normal stroke to open the associated by-pass valve. However, such type of unloader device, in addition to its complicated and large construction, has the further drawback that even in the event that the steering wheel is rotated so suddenly as to move the piston of the power cylinder at a rate higher than the actual hydraulic oil supply rate of the pump, the valve body of the four-port connection valve is easily displaced over the normal stroke to open the associated by-pass valve. Further, to obtain the displaceability over the normal stroke, the substantial stroke of the four-port connection valve is inevitably too large. This leads to an increased range of lost motion of the steering wheel and the steering road wheels of the vehicle with respect to each other during manual steering operation in the event of failure of the auxiliary power control mechanism of the steering system. In other words, the steering wheel has an excessive amount of play, which makes the steering operation unstable.

The present invention has been attained with a view toward effectively solving the foregoing problems, disadvantages and shortcomings attendant conventional arrangements.

SUMMARY OF THE INVENTION

The present invention provides a load relief device for a power steering system having power means including a first and a second hydraulic oil chamber and operable to provide auxiliary power, a hydraulic pressure source, an oil reservoir, and a four-way valve (four-port connection valve) of an open center type for selectively connecting the first and second hydraulic oil chambers to the hydraulic pressure source and the oil reservoir. The four-way valve is actuatable in response to steering torque applied to the power steering system for carrying out the aforesaid selective connection. The load relief device comprises means for detecting the end of a stroke being executed by the power steering system to return the four-way valve to a neutral position thereof, regardless of the steering torque being applied.

Therefore, according to the invention, the aforesaid four-way valve also serves as a load relief short-circuiting valve. Such feature solves the aforementioned conventional problems, for example, by eliminating the conventional arrangement in which oil pressure which is supplied as an auxiliary steering power medium to the power means is also introduced into the by-pass circuit at the stroke end of the power steering system. Further, the device according to the invention is simplified in structure and is capable of operating with high reliability. Still further, the driver or other user need not be concerned with leakage of oil from the by-pass valve, etc. In addition, the device according to the invention is easy to manufacture, and is very suitable for practical use.

The present invention further provides a load relief valve which includes camming portions provided on the piston shaft of the power cylinder for facilitating turning of the steering road wheels or front wheels of the vehicle, to serve as part of the stroke end detecting means, and an actuatable member also forming part of the stroke end detecting means and engageable with the camming portions by reciprocal movement of the piston shaft. The actuatable member is actuated when engaged with either of the camming portions to return the four-way valve to its neutral position, regardless of the steering torque being applied to the power steering system.

Further, the present invention provides a load relief device for a power steering system wherein the input member of the power steering device is journalled in the actuatable member of the stroke end detecting means for rotation in response to operation of the steering wheel. The actuatable member is adapted to swing (tilt) in synchronism with rotation of the input member to cause the four-way valve to selectively connect the two oil hydraulic chambers to the hydraulic pressure source and the oil reservoir.

Exemplary preferred embodiments of the present invention will be described in detail hereinbelow. The above and further objects, details and advantages of the invention will become more apparent from the following detailed description, when read in conjunction with the accompanying drawings.

BRIEF DESCRIPTION OF THE DRAWINGS

FIG. 1 is a sectional view depicting an essential part of a power steering system of a rack-and-pinion type embodying the technical concept of the present invention.

FIG. 2 is a sectional view taken along line 2—2 in FIG. 1, and showing an actuating mechanism for the four-way valve of an open center type.

FIG. 3 is a sectional view taken along line 3—3 in FIG. 1, and showing the action of an actuating cam as part of the load relief device, with unnecessary portions omitted.

FIG. 4 shows another embodiment of the load relief device in accordance with the invention.

DETAILED DESCRIPTION OF PREFERRED EMBODIMENTS

With reference to FIG. 1, there is shown a rack shaft 10, extending through a power assistance hydraulic device in the form of a power cylinder 28 so as to serve as a piston shaft as well as the output member of the power steering system. The rack shaft 10 has the opposite ends thereof engaged by steering road wheels of a vehicle (not shown), and comprises a first member in a steering force transmission route of the vehicle. A pinion gear shaft 12, comprising a second member of the steering force transmission route, meshes with the rack 10A (FIG. 2) of the rack shaft 10, and is adapted to rotate through operation of a steering wheel 50 so as to produce a linear motion of the rack shaft 10. The pinion gear shaft 12 is rotatably supported on two bearings 14A and 14B in a swing cage 15 which forms a member of the stroke end detecting means. The swing cage 15 is in turn rotatably supported on two bearings 18A and 18B in a gear box 16.

As shown in FIG. 2, the axes of the bearings 14A, 14B are out of alignment with those of the bearings 18A, 18B so that the respective rotational axes $O_{14}$, $O_{18}$ of the pinion gear shaft 12 and the swing cage 15 are eccentric with respect to each other by a distance $\epsilon$ in a direction perpendicular to the axis of the rack shaft 10, as shown in FIG. 3. The swing cage 15 has a portion thereof formed as a window (opening) 20 through which the pinion gear shaft 12 meshes with the rack shaft 10, as described above. The window 20 of the swing cage 15 has its opposite side edges provided with slippers 42, 43 projected axially of the rack shaft 10. The slippers 42, 43, which are integral with the swing cage 15, have surfaces 42A, 43A disposed opposite the rack shaft 10 and tapered such that the distance between the surfaces 42A, 43A and the associated surface of the rack shaft 10 becomes gradually larger towards the free ends of the surfaces 42A, 43A. The swing cage 15 has its upper portion formed integrally with an actuating rod 22 for actuating a four-way control valve 24 which may comprise a spool valve of an open center type. The actuating rod 22 is disposed above the cage 15 at the same side as the rack shaft 10, and is spaced from the axis $O_{18}$ of the cage 15 by a distance l. Actuating rod 22 is inserted in an elongated bore 25 formed in an end portion 24A of the four-way valve 24. The bore 25 extends in a direction perpendicular to the sliding direction of the valve 24 so that a swinging motion of the actuating rod 22 about the axis $O_{18}$ may cause a sliding motion of the valve spool of the directional control valve 24, regardless of the steering torque being applied to the shaft 12.

Formed in the surfaces of the four-way valve 24, which is shown as held in its neutral position by the force of a spring (not shown), are three annular grooves 24B, 24C and 24D, the central one 24C of which is in communication with the delivery side of a source for supplying a hydraulic medium (not shown), which may comprise a hydraulic oil pump. The annular grooves 24B, 24D disposed on the respective opposite sides of the central groove 24C are in communication with a reservoir for accumulating the hydraulic medium (not shown), which may comprise an oil tank. The directional control valve 24 is disposed in a housing 26 for sliding movement therein, the housing 26 having two annular grooves 26A and 26B formed therein. The power cylinder 28, which is fixed at the left side of the gear box 16 as viewed in FIG. 1, has an internal cavity thereof partitioned into a right chamber A and a left chamber B by a piston portion 10B forming part of the rack shaft 10. The chambers A and B communicate, respectively, with the grooves 26A, 26B by way of channels 30A, 30B, respectively. When steering torque is applied to the pinion gear shaft 12 through the steering wheel 50, the valve spool of the four-way directional control valve 24 is displaced to selectively connect the right and left oil chambers A, B to the hydraulic oil source and the oil reservoir so that auxiliary power for changing the direction of the steering road wheels in accordance with the direction of rotation of the steering wheel 50 can be obtained by an oil pressure acting on the piston portion 10B of the rack shaft 10 of the power cylinder 28. Such construction does not substantially differ from conventional arrangements. The housing 26 is formed partially of a cover member 32 forming part of the gear box 16, the cover member 32 having formed therein a bore 34 through which the actuating rod 22 extends. The swing cage 15 is permitted to make a reciprocal swinging motion about the axis $O_{18}$ until the actuating rod 22 strikes the inner wall surface of the bore 34.

As shown in FIG. 1, stoppers 11, 11 are threadedly secured to the opposite ends of the rack shaft 10 together with tie rods (not shown). The stroke ends of the rack shaft 10 are delimited by stoppers 11, 11 in such a manner that either of the stoppers 11 strikes an associated one of the cylindrical end covers 16A or 28A of the gear box 16 and the power cylinder 28 through which the rack shaft 10 extends, which determines the maximum steering wheel turning angle of the power steering system. When one of the stoppers strikes the end cover 16A or 28A, the rack shaft 10 becomes locked.

As clearly shown in FIG. 3, the rack 10A on the rack shaft 10 has its opposite end portions formed with camming portions 40, 41 in the form of slanted surfaces which form part of the stroke end detecting means. The directions of inclination of the slanted surfaces 40, 41 are such that the surfaces 40, 41 gradually become projected radially outwardly of the rack shaft 10 towards the respective ends of the shaft 10. Further, the surfaces 40, 41 are inclined in the same directions as those of respective ones of the tapered surfaces 42A, 43A of the above-described slipper portions 42, 43. When the rack shaft 10 moves, the camming portion 40 or 41 strikes the associated slipper portion 42 or 43 immediately before the rack shaft 10 is locked. When the shaft 10 is locked the slipper portion 42 or 43 slides over the associated camming portion 40 or 41 onto a cylindrical portion 10C or 10D of the rack shaft 10 so that the swing cage 15 is automatically moved to its neutral position.

Arranged at the rear side of the rack shaft 10, i.e., at the opposite side of the rack shaft 10 to the pinion gear shaft 12, is an urging assembly 45 which comprises a rack guide 46 disposed in contact with the rear side surface of the rack shaft 10 for guiding the rack shaft 10 being moved, a spring 47 urging the rack shaft 10 toward the pinion gear shaft 12, a guide screw 48 disposed at a rear side of the rack guide 46 for adjusting the urging force of the spring 47, and a Belleville spring 49 interposed between the rack guide 46 and the screw 48. The gap C between the rack guide 46 and the guide screw 48 must be set at such a value that the four-way directional control valve 24 can be maintained in its neutral position after the slipper 42 or 43 has slid onto the cylindrical portion 10C or 10D. Otherwise, if the cap C is too large, the slipper 42 or 43, if given further steering torque after it has slipped onto the associated cylindrical portion 10C or 10D of the rack shaft 10, would overcome the force of the spring 47 and the Belleville spring 49 to cause a further rotation of the swing cage 15. The slippers 42, 43 and the camming portions 40, 41 should desirably be configured such that they can be smoothly or non-frictionally disengaged from their locked positions when the steering wheel 50 is turned in a reverse direction so as to turn back the rack shaft 10 with the slipper 42 or 43 locked on the cylindrical portion 10C or 10D. For this reason, the slippers 42, 43 and the camming portions 40, 41 have the above-described configurations.

The operation of the load relief device according to the invention will now be described. When no steering torque is applied to the pinion gear shaft 12, the four-way directional control valve 24 is maintained in its neutral position by the urging force of the aforementioned spring (not shown). In such neutral position, the open center type four-way directional control valve 24 permits hydraulic oil fed from the hydraulic oil source to directly return to the oil reservoir, with no load applied to the pump. During such condition, the slippers 42, 43 of the swing cage 15 assume a position parallel to the rack shaft 10, with the swing cage 15 being maintained in the neutral position thereof, as shown in FIG. 3.

Assuming now that the pinion gear shaft 12 (which serves as an input member of the power steering system) is given steering torque in the clockwise direction as viewed in FIG. 3, the steering torque is transmitted from the pinion gear shaft 12 to the rack shaft 10 so that the swing cage 15, against which the pinion gear shaft 12 is urged by the urging force of the urging assembly 45 via the rack shaft 10, is acted upon by the frictional rotational force of the bearings 14A, 14B produced by the rotation of the pinion gear shaft 12 as well as the steering torque of the shaft 12 to make a clockwise swinging motion about the axis $O_{18}$. The displacement of the shaft 12 caused by such swinging motion is amplified by the lever ratio $l/\epsilon$ through the actuating rod 22 integral with the swing cage 15, and the amplified displacing force acts upon the directional control valve 24 such that the valve 24 is moved to establish connections between the oil source and the right hydraulic chamber A as well as between the oil source and the left chamber B, thus supplying auxiliary power to the power cylinder 28. At such time, the slippers 42, 43 of the swing cage 15 are positioned in a plane slightly clockwise inclined, as indicated in chain line in FIG. 3. As the rack shaft 10 is linearly moved toward its stroke end by the auxiliary power and the rotational force of the pinion gear shaft 12, the right camming portion 40 thereof approaches the slipper 42. When the rack shaft 10 is given further steering torque, the slipper 42 and the camming portion 40 strike against each other immediately before the stroke end, and then the slipper 42 slips onto the cylindrical portion 10C which is continuous with the camming portion 40. At this instant, the swing cage 15, which cooperates with the camming portion 40 to form the stroke end detecting means, has its angle of inclination returned to a value such that the slippers 42, 43 are in a plane parallel with the rack shaft 10. Accordingly, the directional control valve 24 is returned to its neutral position, regardless of the steering torque applied to the shaft 12, which causes a short circuit between the hydraulic oil source and the oil reservoir, thus releasing loads from the pump. Further, at the same time, auxiliary power is also reduced, which gives the driver a considerably heavy steering feeling and also mitigates the mechanical shock produced when the stopper 11 strikes the end cover 16A immediately thereafter.

When the pinion gear shaft 12 is rotated in the counterclockwise direction as viewed in FIG. 3, by means of steering wheel 50, the swing cage 15 is leftwardly swung, and correspondingly, the left camming portion 41 of the rack shaft 10 approaches the slipper 43 until the slipper strikes the camming portion 41. At this instant, the swing cage 15 is returned to its neutral position, with the directional control valve 24 correspondingly returned to its neutral position. A steering action is then carried out in the same manner as the above-described steering action wherein the pinion gear shaft 12 is rotated in the clockwise direction.

Although in the foregoing embodiment a four-way directional control valve of a slide valve type is employed, the present invention is not limited in its application to such valve type. Any suitable type of value may be employed in the load relief device of the present invention, regardless of the type of steering gear employed therewith, provided that such valve falls into the category of an open center type four-way valve, and is capable of making a selective connection between the oil passages of the hydraulic oil circuit in accordance with the direction and magnitude of the steering torque applied to the steering wheel so as to obtain auxiliary power, and is further capable of displacing the valve body thereof regardless of the steering torque applied.

FIG. 4 illustrates another embodiment of the load relief device according to the present invention. In such embodiment, a plate spring 121 is secured on the swing cage 115 with the portions thereof near its opposite ends being projected outwardly and its opposite ends being bent inwardly, thus serving as slippers 142, 143. When the slipper 142 or 143 strikes against an associated camming portion 140 or 141 formed on a rack shaft 110 as a result of applied steering torque, the slipper 140 or 141 is forcibly bent to return the swing cage 115 to the neutral position thereof. When further steering torque is applied, the slipper 142 or 143 is further forced to be bent into an opening 120 defined in a peripheral wall of the swing cage 115. At this instant, the driver feels an increased resistance in the movement of the steering wheel as he grips same, and thus he is forewarned of an impending restraint on the stroke of the rack shaft 110. After the slipper 142 or 143 is forced onto the cylindrical portion 110C or 110D, the slipper 142 or 143 is locked thereat, with its inner side surface being kept in urging contact with a stopper surface 120A or 120B formed at the respective peripheral ends of the opening 120. With the slipper 142 or 143 in such locked position, when application of steering torque is interrupted, the slipper 142 or 143 is automatically swung back due to its elastic force to actuate the directional control valve. The power steering system provided with such construction in accordance with the invention can be restored to its original state from its locked state very rapidly and smoothly.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. In a power steering system for a vehicle including: a source for supplying a hydraulic medium; a reservoir for accumulating said hydraulic medium; a hydraulic cylinder for providing power assistance to a steering operation of said vehicle; said hydraulic cylinder having two chambers defined by a piston; a steering rack supporting said piston; a steering pinion operably engaged with said steering rack and adapted for rotary movement in unison with said steering operation of said vehicle; said steering rack being adapted to move linearly in response to said rotary movement of said steering pinion; a four-way valve of the open-center type having a neutral position in which said source is connected with said reservoir, and a power-assist position in which said source is selectively connected with either one of said chambers of said hydraulic cylinder; and said four-way valve being actuatable to be selectively set at either of said neutral and power-assist positions, in response to rotary movement of said steering pinion;

a load relief device comprising:
a four-way valve actuation member arranged to be swingable about an axis substantially parallel to the axis of said steering pinion in response to rotary movement of said steering pinion, so as to move said four-way valve by said swinging motion; and
means for operating said actuation member upon detecting an end of said linear movement of said steering rack such that said four-way valve is moved into said neutral position thereof regardless of said rotary movement of said pinion.

2. A load relief device according to claim 1, wherein: said actuation member operating means comprises camming portions provided on opposite end portions of said steering rack and extending longitudinally of said steering rack, said actuation member being actuatable by engagement thereof with said camming portions, whereby said actuation member is adapted to cooperate with said camming portions through reciprocal movement of said steering rack to bring said four-way valve to said neutral position thereof.

3. A load relief device according to claim 2, further comprising:
stoppers disposed at opposite ends of said steering rack for limiting the stroke end; and
wherein said four-way valve is brought into said neutral position thereof through the action of said camming portions and said actuation member immediately before said stoppers are actuated.

4. A load relief device according to claim 2, wherein: said four-way valve comprises a valve housing and a valve spool arranged for sliding movement in said valve housing.

5. A load relief device according to claim 4, wherein: said actuation member includes an actuating rod arranged in spaced relation to the axis of said actuation member;
said actuating rod is inserted in a bore formed in said valve spool; and
whereby said valve spool is slidingly moved for carrying out said selective connection through said actuating rod by swinging motion of said actuation member about the axis thereof.

6. A load relief device according to claim 5, wherein: said steering pinion and said actuation member have axes thereof disposed in eccentric relation to each other.

7. A load relief device according to claim 6, wherein: the direction in which the axes of said steering pinion and said actuation member are eccentric to each other is normal to the axis of said steering rack.

8. A load relief device according to claim 2, wherein:
said actuation member comprises a swing cage, said swing cage having an opening through which said steering rack and said steering pinion mesh with each other.

9. A load relief device according to claim 8, wherein:
said swing cage includes slippers provided at opposite side edges thereof and projected outwardly in axial directions of said steering rack, whereby said swing cage is adapted to make a swinging motion when said slippers are urged against each other for bringing said four-way valve into said neutral position thereof.

10. A load relief device according to claim 8, wherein:
said steering rack includes a rack portion and cylindrical portions disposed outwardly of said rack portion near opposite ends thereof; and
said camming portions are formed at opposite ends of said rack portion so as to be continuous with respective ones of said cylindrical portions.

11. A load relief device according to claim 9, wherein:
said slippers each have face disposed opposite said steering rack, each said face being tapered so as to become gradually more remote from said steering rack toward a projected end of the associated slipper.

12. A load relief device according to claim 11, wherein:
said slippers are formed integrally with said swing cage.

13. A load relief device according to claim 11, wherein:
said swing cage includes a plate spring secured thereon, said plate spring having portions adjacent opposite ends thereof which are projected outwardly and said opposite ends thereof being bent inwardly, thereby defining said slippers.

14. A load relief device according to claim 8, further comprising:
urging means disposed at a side of said steering rack opposite to a side thereof at which said steering pinion meshes with said steering rack, said urging means urging said steering rack against said steering pinion.

15. A load relief device according to claim 14, wherein:
said urging means comprises a rack guide disposed in contact with said opposite side of said steering rack, a member for elastically urging said steering guide against said rack shaft, and a screw for adjusting the urging force of said elastic member.

* * * * *